United States Patent [19]

Duesler et al.

[11] Patent Number: 5,174,110
[45] Date of Patent: Dec. 29, 1992

[54] UTILITY CONDUIT ENCLOSURE FOR TURBINE ENGINE

[75] Inventors: Paul W. Duesler; Wendell R. Loso, both of Manchester, Conn.

[73] Assignee: United Technologies Corporation, Hartford, Conn.

[21] Appl. No.: 777,971

[22] Filed: Oct. 17, 1991

[51] Int. Cl.[5] ............................................. F02K 3/02
[52] U.S. Cl. .................................... 60/226.1; 439/34; 439/179; 138/111; 138/113; 244/129.1
[58] Field of Search ................. 60/39.07, 226.1, 39.33; 285/137.1; 439/34, 178, 179, 191; 138/111, 113; 174/95; 244/129.1

[56] References Cited

U.S. PATENT DOCUMENTS

| | | | |
|---|---|---|---|
| 3,494,657 | 2/1970 | Tantlinger et al. | 439/34 |
| 4,116,000 | 9/1978 | Martin et al. | 60/226.1 |
| 4,149,567 | 4/1979 | Weirich | 138/111 |
| 4,652,064 | 3/1987 | Cetrone | 439/191 |
| 4,804,208 | 2/1989 | Dye | 285/137.1 |
| 4,815,984 | 3/1989 | Sugiyama et al. | 439/34 |
| 4,992,626 | 2/1991 | Monroe | 174/95 |

Primary Examiner—Richard A. Bertsch
Assistant Examiner—Howard R. Richman

[57] ABSTRACT

A readily-removable protective modular enclosure (50) houses a plurality of utility conduits (42) which bridge a zoned annular volume (40) disposed between a turbine engine's core (20) and fan case (30) zones, the bridging utility conduits (42) completing a three-zoned wiring harness originating on the engine's fan case (30) and terminating at a plurality of engine core terminals (24). The enclosure (50) also houses a branching interface (70) through which a utility flow, originating at either the fan case (30) or engine core (20), is directed to a dedicated outgoing utility conduit (32, 22) which services a specific zone (100).

6 Claims, 3 Drawing Sheets

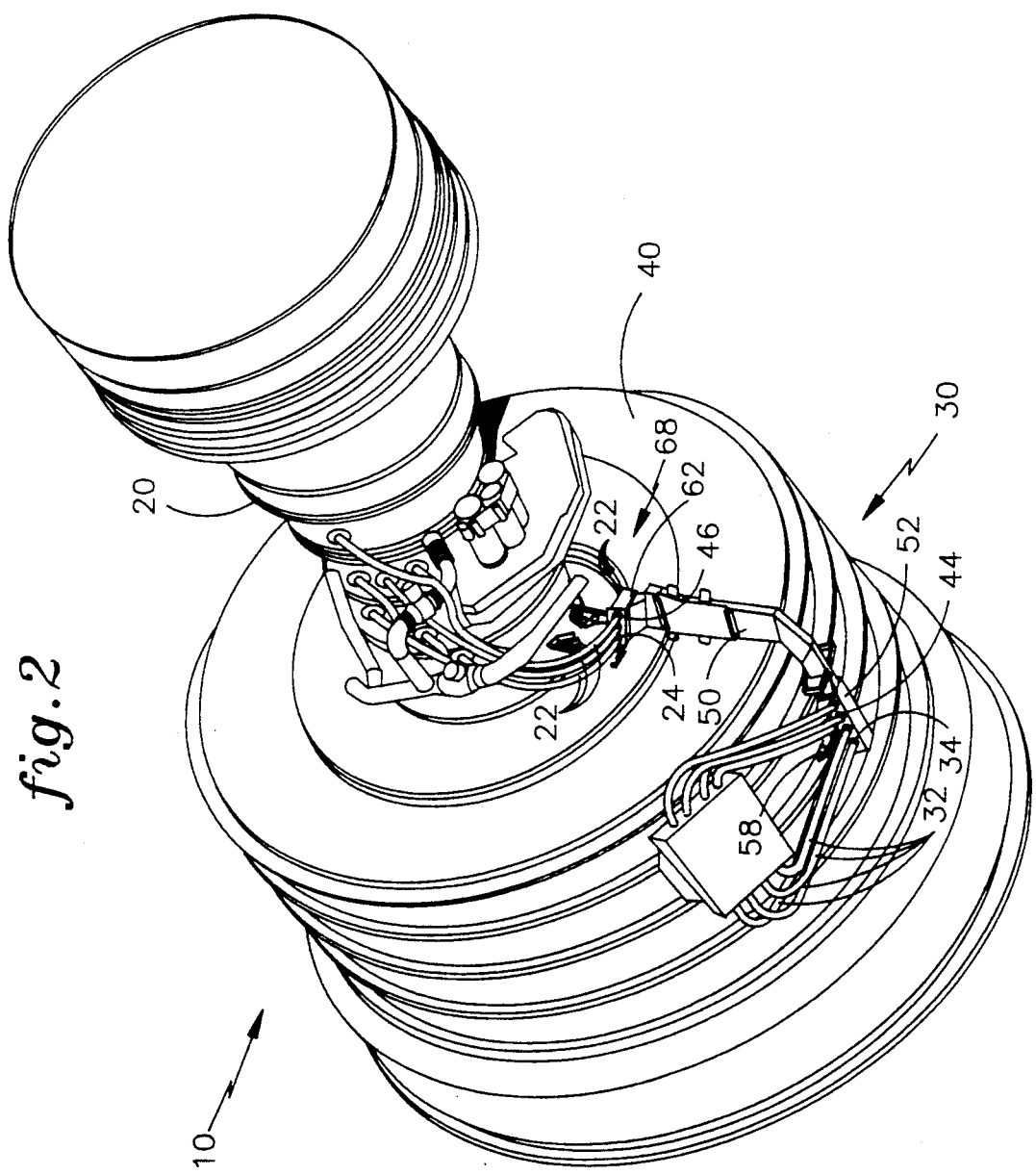

UTILITY CONDUIT ENCLOSURE FOR TURBINE ENGINE

DESCRIPTION

1. Field of the Invention

This invention relates to turbine engines, and more particularly to utility distribution apparatus used therein.

2. Background of the Invention

Various utilities are necessary for the operation and management of a gas turbine engine. Axially and circumferentially branched conduit networks disposed about the engine's periphery typically provide the distribution system necessary for utility conveyance. These conduits channel electricity, fuel, compressed air, oil, and hydraulic fluid through and around the engine and between the engine and the mainframe in which it is installed, such as an aircraft or a land-based power generator.

Increasingly sophisticated engine controls require yet additional engine mounted utility conduits which are necessary for enhanced engine management purposes. The bulk of these additional conduits are directed toward electrical transmission requirements.

According to the prior art, a plurality of hard-wired electrical conduits bridge the annular volume disposed between the engine's fan case and core, hereinafter termed the fan/core interface. The numerous electrical leads carried by and extending from each conduit are distributed in so-called octopus style about the engine en route to their designated terminals. These conduits and electrical leads are axially and circumferentially splayed about, and are semi-permanently affixed to various engine surfaces, including the peripheries of the fan case and engine core. These conduits and leads are typically intertwined and layered about the engine's periphery in the course of establishing the necessary electrical connections, due in part to the assignment of conduits carrying electrical leads dedicated to, for example, similar sensing or controlling functions, wherein the corresponding sensors or controllers are widely distributed over the core's periphery, to which these dedicated leads are directed.

Engine-installed electrical leads and conduits are exposed to extreme heat, vibration and shock loading, as well as structural interferences which may cause premature failure due to intermittent or continuous abrasion and chaffing. Those leads and conduits disposed across the fan/core interface at the underside of an aircraft-installed engine are particularly susceptible to abrasion and chaffing which may inadvertently occur during engine maintenance and repair or during routine engine removal replacement, resulting in yet additional costly and time-consuming repairs and aircraft downtime.

Substantial amounts of time and labor, in addition to actual aircraft downtime, are generally required to diagnose and locate an elusive fault in an electrical conduit or lead, especially in those engines having advanced electronic management systems, which typically have an engine-wide electrical network including upwards of 200 electrical leads secured by a like number of clamps and clips. Yet additional time and labor is then required to remove and correctly replace each of the numerous and intertwined electrical leads of the defective hardwired electrical conduit after effective troubleshooting has been accomplished.

Another problem in diagnosing, removing, and replacing a damaged electrical conduit or lead is the impediment of commonly used relatively heavy thrust reverser doors (each ship-set weighing approximately 1000 pounds) which must be hoisted away from the engine core to enable sufficient service access to the engine's periphery, further negativing on-aircraft serviceability.

Yet another problem with the prior art is the time-consuming effort necessary to fully engage/disengage the fan case from its engine core due to the numerous utility conduits passing through the fan/core interface, thus complicating segmentation of the engine into its more readily transportable components.

In view of these limitations, it has become the current practice of at least one major airline to remove and replace an engine having an operationally defective electrical conduit, diagnosed as being located in the fan/core interface, with a known operative engine, followed by the immediate return of the aircraft to service, rather then attempting an on-aircraft diagnosis, repair or replacement of the defective electrical conduit(s). This practice is clearly quite costly in terms of necessary spare-engine inventory, but is apparently cost effective when viewed in terms of potentially extensive aircraft downtime and schedule interruptions, thereby further indicating the severity of the prior art's limitations.

Objects of the invention include organizing, protecting and zoning the numerous electrical conduits which bridge the fan/core interface thereby facilitating the speedy removal and replacement of a defective electrical lead.

SUMMARY OF THE INVENTION

It is therefore an object of the present invention to provide a readily-removable and replaceable protective modular enclosure for a plurality of utility conduits which bridge the annular volume disposed between a turbine engine's core and fan case, wherein said conduits are integrated into, and are removable with, the modular enclosure.

Another object of the present invention is to provide means for zoning outgoing utility flow.

These and other objects will become apparent in the further course of this disclosure and appended claims.

The present invention provides a releasably secured modular utility conduit enclosure which bridges the annular volume disposed between a turbine engine's axially extending engine core and radially outwardly extending fan case. Integration of this enclosure into the engine's utility distribution systems facilitates the speedy field removal and replacement of defective conduits, thereby minimizing aircraft downtime. Once the enclosure, having one or more suspected defective conduits, has been removed from the engine, off-the-aircraft troubleshooting may proceed independently of aircraft scheduling demands.

More particularly, the shaped conduit enclosure of the present invention encloses a plurality of utility conduits which terminate proximate to both enclosure ends. These conduit termini are releasably secured to a plurality of mating fan case and engine core termini, either through direct engagements proximate to the enclosure ends or through interfaces disposed at each enclosure end face. A plurality of releasably secured cover panels disposed on a plurality of lateral surfaces of the enclosure, at the midspan and ends, provide access to the conduits contained therein for both on and off-the-aircraft diagnostic purposes, and through which the necessary connections and reconnections between incoming utility conduits and engine-zone-specific outgoing conduits which feed into an enclosure-contained interface may be made.

A plurality of brackets releasably secures the enclosure to the engine at the fan case and engine core. In addition, a plurality of laterally extending tabs disposed on the enclosure proximate to the engine core are captured by the closed thrust reverser doors, thereby providing an additional enclosure retention means. An annular fire seal extending radially outwardly from the enclosure in the plane of the downstream edge of the fan case interacts with the closed thrust reverser doors to provide a fire wall between the fan case environment and the engine core environment.

BRIEF DESCRIPTION OF THE DRAWINGS

FIG. 2 is an isometric view of the installed invention.

DETAILED DESCRIPTION

Figure 1A:
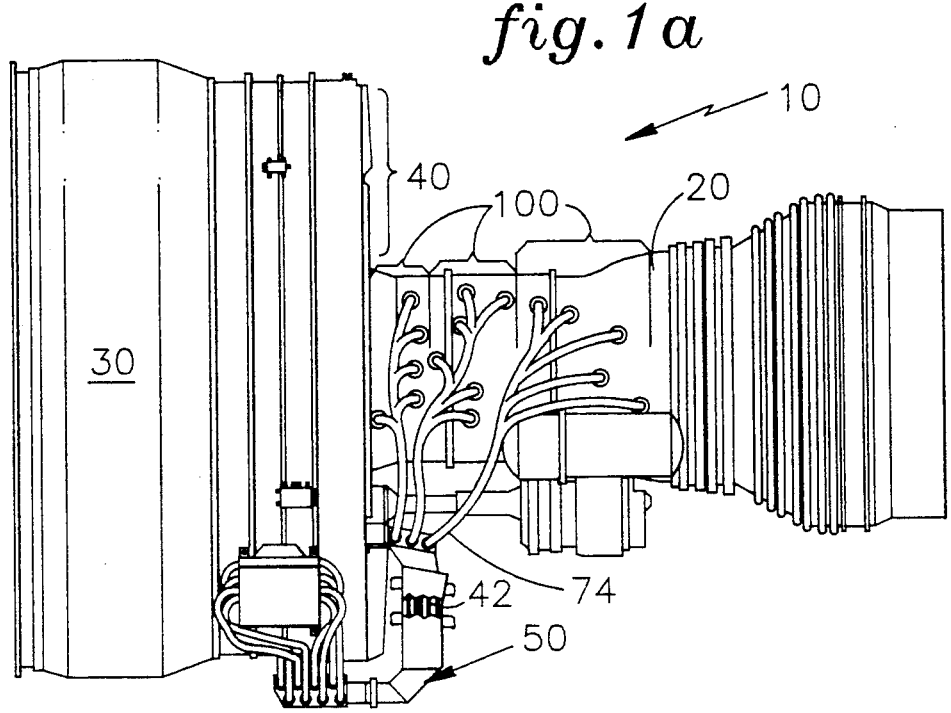
FIG. 1a shows a side view of a turbine engine in which the present invention is installed.
Figure 1B:
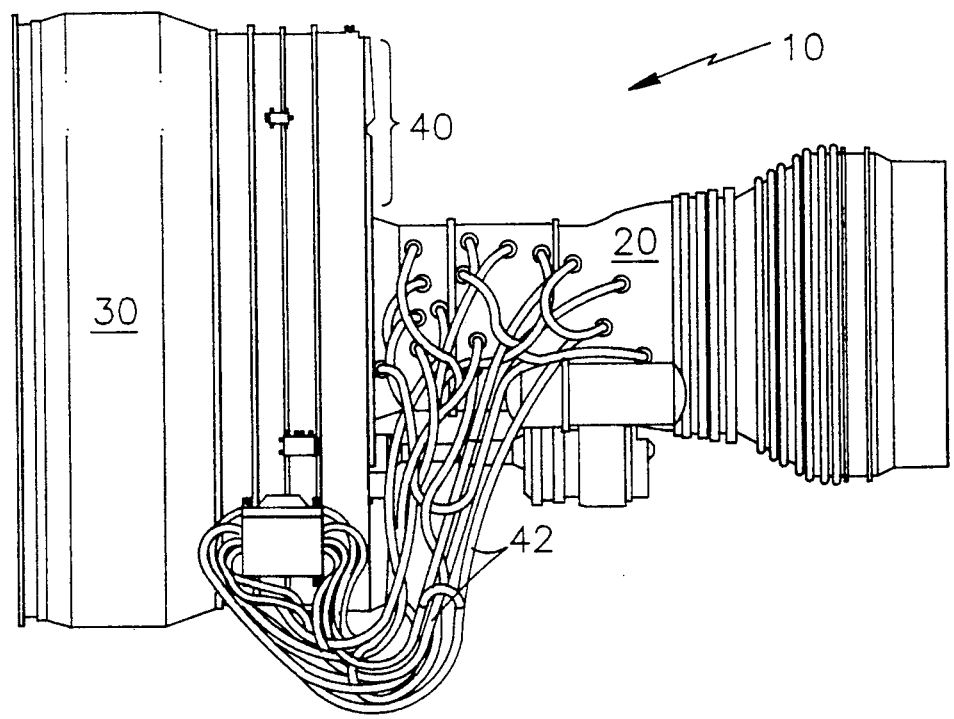
FIG. 1b is a side view of an engine illustrating typical utility conduit distribution of the prior art.

Referring now to FIG. 1a, the invention shown is an enclosure 50 for containing and protecting a plurality of utility conduits 42 which bridge the annular volume 40 disposed between the engine core 20 and fan case 30 of a gas turbine engine 10, thereby improving on the exposed, tangled and relatively unorganized hardwired conduit networks of the prior art, shown in FIG. 1b. This is accomplished by dividing the overall wiring harness into three zones: the fan case 30, the engine core 20, and the annular volume 40 disposed therebetween, and by housing the conduits in the third zone-annular volume 40 within the protective enclosure 50.

Figure 3:
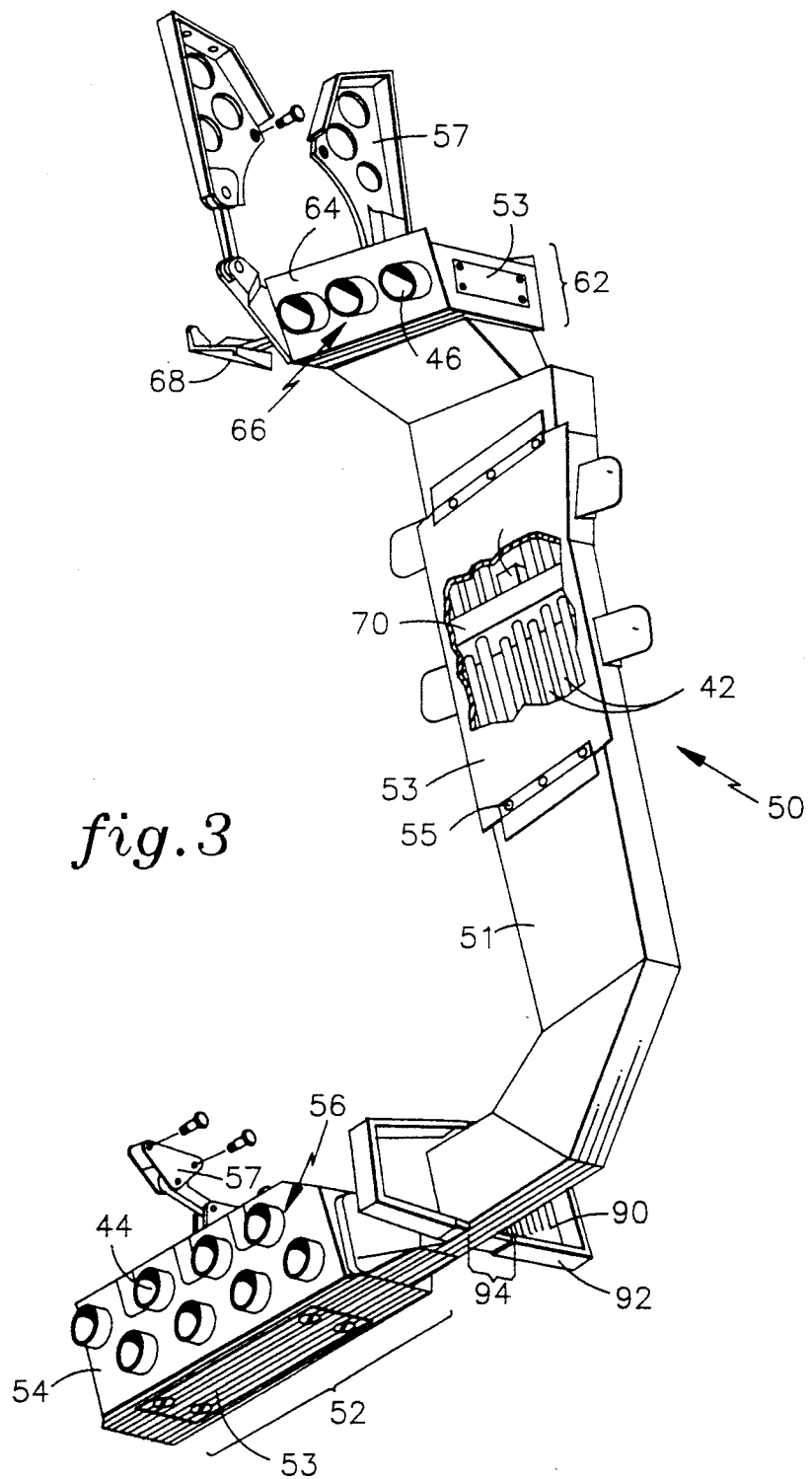
FIG. 3 is a view of conduit enclosure removed from the engine.

More particularly, and with reference to FIGS. 2 and 3, the enclosure 50, which has a trapezoidal cross-section throughout its overall serpentine length, has a first end 52 disposed proximate to the fan case 30, and a second end 62 disposed proximate to the engine core 20. The plurality of bridging utility conduits 42 disposed through the enclosure 50 communicate with a plurality of first terminals 44 disposed at the enclosure's first end 52 and with a plurality of second terminals 46 disposed at the enclosure's opposing second end 62.

The bridging conduits first terminals 44 are releasably secured to a mating set of fan case conduit first terminals 34 disposed on a corresponding fan case disposed utility conduits 32. These connections are made through one or more ports 56 disposed through a first face 54 using well known connection means specific to a given utility.

In a like manner, the fan case-engine core connection is completed when the opposing second terminals 46 of the bridging conduits 42 are releasably attached to the terminals 24 disposed on the corresponding core disposed utility conduits 22. As with the connections accomplished at the first enclosure end 52, the releasable connections of the second terminals at the enclosure's second end 62 are made through one or more ports 66 disposed through the enclosure's second face 64. The first and second face ports 56, 66 can accommodate single or multiple conduit pipes depending on the utility being passed therethrough. As is well known to those skilled in the art, a variety of bulkhead mounted connectors installed through the first and/or second faces 54, 64 of the enclosure 50 may be employed for this purpose.

The enclosure's first and second ends 52, 62 are releasably secured to the fan case 30 and engine core 20, respectively. Relative to the engine's axial centerline, a plurality of radially inwardly extending brackets 57 disposed on or proximate to the enclosure's first end 52 are releasably secured to one or more first end attachment points 58 on the fan case 30 using known retention means such as a bolt 59. In a like manner, an additional plurality of brackets 57 disposed on or proximate to the enclosure's second end 62 are releasably secured to one or more second end attachment points 68 on the engine core 20. According to this invention, the plurality of terminals 24, 34, 44, 46 and attachment points 58, 68 can be released in a relatively short time period (10-20 minutes) to allow for the removal and replacement of one enclosure 50 with another, thereby facilitating speedy field removal and minimizing aircraft downtime. These brackets 57 have a flanged structure, and are configured to readily and correspond with their respective mounting attachment points 68, 58 on the engine core 20 or fan case 30.

It is through the enclosure 50 through which a utility flow, whether fluid, and/or electrical, is directed. The bridging utility conduits 42 are passed through the enclosure 50 to fluidically and/or electrically join together its first and second ends 52, 62 and channel electricity, fuel, compressed air, oil, and/or hydraulic fluid, as required, between the engine core 20 and fan case 30. While a fluid or electricity is separately channeled within a dedicated conduit 42, a given conduit's inflow may be redirected to an engine-zone-specific outgoing conduit at an enclosure-contained interface 70.

Access to the enclosure's interior, to the interface 70, as well as to the end connectors 44, 46, is gained by removing enclosure cover panel 53 disposed on an outer surface 51 of the enclosure 50 at its midspan and/or ends 52, 62. A plurality of bolted connections 55 secure the cover panels 53 to the enclosure 50.

The plurality of enclosure contained bridging utility conduits 42 are branched through an interface 70 to facilitate optimal fan case 30 and engine core 20 harness design. Through this interface 70, conduit layout may be independently optimized according to the particular utility flow needs of a particular engine configuration. More particularly, utility flow is directed by the interface 70 to a specific engine core or fan case zone region 100 (such as shown in FIG. 1a) through one or more dedicated outgoing utility conduits 74 which contain all of those utility leads required by that specific engine zone region 100. While a plurality of regions 100 are located on both the fan case and engine core 20, only three such regions 100 are shown on the latter for the sake of clarity. Utility leads are bundled within the dedicated conduits 74 according to a destined engine core zone region 100, rather than by the type of utility, thereby obviating the intertwined and layered utility conduit leads of the prior art. For example, electrical lines leading to control or sensory functions previously fed out from a single conduit and which typically spanned a broad region of the engine core's periphery are now directed by the interface 70 to and through a specified conduit 74 which services its designated engine zone region 100.

Accordingly, organized distribution of the conduits 42 to particular engine core zone regions 100 prevents the helter-skelter distribution of the prior art conduits as shown in FIG. 1b. Again referring to FIG. 3, conduit interconnections, using well known connection means, provided at the branching interface 70 allow for customized tailoring of the necessary conduits 42 of a particular engine configuration. Access to the branching interface 70 is provided by removal of the proximate cover panel 53 when the enclosure 50 is installed on the engine 10. Alternatively, the branching interface 70 is readily accessed for off-the-engine bench testing after the enclosure 50 has been removed from the engine 10.

While the above discussion has focused on utility flow distribution to the engine core 20, the apparatus of this invention may also direct a utility flow from the engine core 20 to the fan case 30 through analogous dedicated conduits (not shown) as directed by the interface 70. Thus, the conduit 42 extending from either/or both sides of the interface 70 between the engine core 20 and fan case 30 may be independently zoned at both engine structures to achieve the objects of this invention.

A fire wall 90 is also disposed on the enclosure's outer surface 51 and extends radially outwardly from the first end 52 of the enclosure 50 in the plane of the downstream edge of the fan case 30. A fire wall seal edge 92 having a bulb-seal cross-section is disposed on the periphery of the fire wall seal 90 and contacts corresponding internal surfaces of surrounding engine case panels to isolate the fan case environment from the engine core environment. A high-temperature-resistent silicone-based elastomeric material offering certain shape retaining properties defines the shape of the bulb-seal cross-section and is covered by a skin comprised of a high temperature, high wear capable material such as a densely woven ceramic cloth. The fire wall 90 is constructed of sheet metal or other material having the necessary thickness and flame retarding properties needed to ensure the maintenance of the divided environments of the fan case 30 and engine core 20.

Other modifications and improvements of the invention herein disclosed may occur to those skilled in the respective arts and all such modifications and improvements are deemed to be within the scope of the invention as defined by the appended claims.

I claim:

1. In a gas turbine engine having an engine core annularly disposed about a longitudinal axis passing therethrough, a fan case disposed radially outwardly of the engine core, and a fluid/electrical utility flow between the fan case and engine core, the improvement comprising a three-zoned utility distribution harness characterized by:
   a first zone having a plurality of fan case disposed utility conduits each having a first terminal,
   a second zone having a plurality of engine core disposed utility conduits each having a second terminal,
   a third zone having a plurality of bridging utility conduits spanning an annular volume disposed between the fan case and engine core, each bridging utility conduit having a first and an opposing second terminal, the first terminals of the fan case disposed utility conduits and of the bridging conduits in releasable communication and the second terminals of said engine core disposed utility conduits and of the bridging conduits in like releasable communication, wherein the communicating fan case, bridging, and engine core conduits serially convey a fluid/electrical flow between the fan case and engine core.

2. In a gas turbine engine having an engine core annularly disposed about a longitudinal axis passing therethrough, a fan case disposed radially outwardly of the engine core, and a fluid/electrical utility flow between the fan case and engine core, the apparatus comprising:
   a plurality of fan case disposed utility conduits each having a first terminal,
   a plurality of engine core disposed utility conduits each having a second terminal,
   a plurality of bridging utility conduits spanning an annular volume disposed between the fan case and engine core, each bridging utility conduit having a first and a lengthwisely opposing second terminal, and
   an enclosure disposed about the bridging conduits, the enclosure further having a first face disposed proximate to a first end, the first end releasably secured to the fan case, and a second face disposed proximate to a second end, the second end releasably secured to the engine core, the first face including an opening through which the first terminals of the fan case disposed utility conduits and of the bridging conduits releasably communicate, the second face including an opening through which the second terminals of the engine core disposed utility conduits and of the bridging conduits releasably communicate, wherein the communicating bridging, engine core, and fan case conduits serially convey a fluid/electrical flow between the fan case and engine core.

3. The enclosure of claim 2, further characterized by:
   means for directing an incoming utility flow from an incoming utility conduit to a different outgoing utility conduit.

4. The enclosure of claim 2, further characterized by:
   means for directing a plurality of outgoing utility flows to a common engine zone region.

5. In a gas turbine engine having an engine core annularly disposed about a longitudinal axis passing therethrough, a fan case disposed radially outwardly of the engine core, and a fluid/electrical utility flow between the fan case and engine core, the apparatus comprising:
   a plurality of fan case disposed utility conduits each having a first terminal,
   a plurality of engine core disposed utility conduits each having a second terminal,
   a plurality of bridging utility conduits spanning an annular volume disposed between the fan case and engine core, each bridging utility conduit having a first and a lengthwisely opposing second terminal,
   an enclosure disposed about the bridging conduits, the enclosure further having a first face disposed proximate to a first end, the first end releasably secured to the fan case, and a second face disposed proximate to a second end, the second end releasably secured to the engine core, the first face including an opening through which the first terminals of the fan case disposed utility conduits and of the bridging conduits releasably communicate, the second face including an opening through which the second terminals of the engine core disposed utility conduits and of the bridging conduits releasably communicate, means for directing an incoming utility flow from an incoming utility conduit to a different outgoing utility conduit, and means for directing a plurality of outgoing utility flows to a common engine zone region, wherein the communicating bridging, engine core, and fan case utility conduits serially convey a fluid-/electrical flow between the fan case and engine core.

6. The enclosure of claim 5, further characterized by:

an annular fire wall extending radially outwardly from the enclosure in the plane of the downstream edge of the fan case, wherein the fire wall separates the fan case environment from the engine core environment.

* * * * *